United States Patent [19]

Anglin

[11] Patent Number: 4,802,752
[45] Date of Patent: Feb. 7, 1989

[54] METHOD OF AND APPARATUS FOR MOUNTING A MIRROR TO A ROTATABLE SHAFT

[75] Inventor: Noah L. Anglin, San Jose, Calif.

[73] Assignee: Greyhawk Systems, Inc., Milpitas, Calif.

[21] Appl. No.: 188,705

[22] Filed: May 4, 1988

Related U.S. Application Data

[63] Continuation of Ser. No. 914,347, Oct. 2, 1986, abandoned.

[51] Int. Cl.$^4$ .................................................. G02B 7/18
[52] U.S. Cl. ..................................... 350/631; 403/305; 403/314; 285/322
[58] Field of Search ............... 350/631, 632, 640, 600, 350/6.6, 320

[56] References Cited

U.S. PATENT DOCUMENTS

| | | | |
|---|---|---|---|
| 1,513,546 | 10/1924 | Gerken | 350/640 |
| 2,066,276 | 12/1936 | Harrall et al. | 403/314 |
| 4,187,452 | 2/1980 | Knappe et al. | 350/6.6 |
| 4,441,837 | 4/1984 | Mastroni | 403/305 |
| 4,655,543 | 4/1987 | Montagu | 350/6.6 |

FOREIGN PATENT DOCUMENTS

| | | | |
|---|---|---|---|
| 491636 | 6/1919 | France | 285/322 |
| 8458 | 6/1915 | United Kingdom | 285/322 |

Primary Examiner—Jon W. Henry
Attorney, Agent, or Firm—Flehr, Hohbach, Test, Albritton & Herbert

[57] ABSTRACT

A mirror is mounted to a rotatable shaft by means of an adapter with a tubular end section and a slot at the other end. An end of the shaft is inserted into this tubular section an a protruding part of the mirror is centrally inserted in the slot. The external surface of the tubular section is tapered which matches the tapered inner surface of a clamp ring disposed around the adapter. By pressing the clamp ring longitudinally, the tubular section of the adapter becomes fastened around the shaft.

10 Claims, 1 Drawing Sheet

U.S. Patent     Feb. 7, 1989     4,802,752
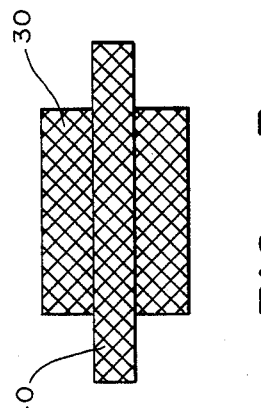
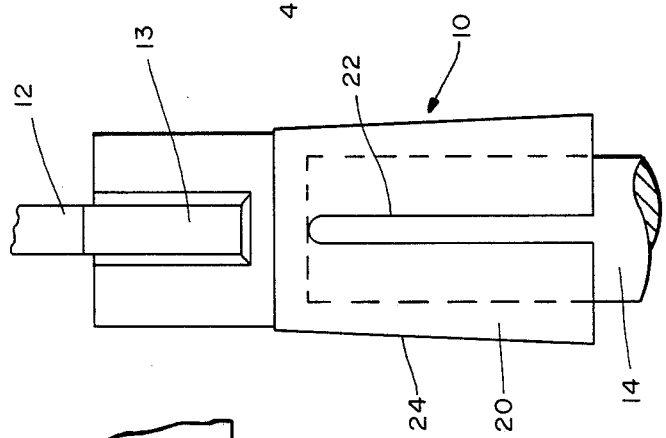
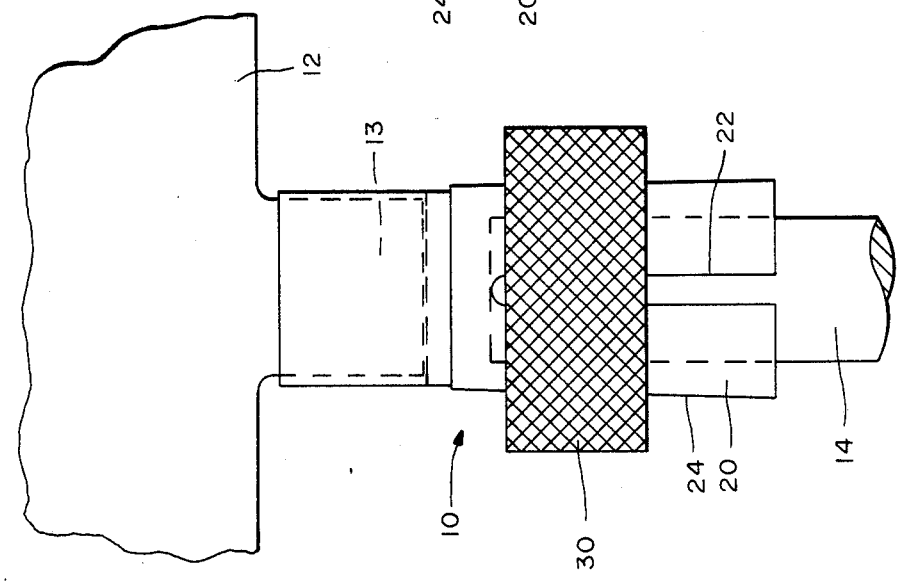

METHOD OF AND APPARATUS FOR MOUNTING A MIRROR TO A ROTATABLE SHAFT

This is a continuation of application Ser. No. 914,347 filed Oct. 2, 1986, now abandoned.

BACKGROUND OF THE INVENTION

This invention relates to a method of and apparatus for mounting a mirror to a rotatable shaft and more particularly to the technology of mounting a precision mirror to the shaft of a motor or a galvanometer used for laser scanning.

In an optical image projection system with a laser-addressed liquid crystal cell, a laser beam scans the cell illustratively by means of mirrors which are each rotatably mounted to the shaft of a galvanometer as explained, for example, by Heinz and Oehrle ("Rapid Generation of Complex Images with a Liquid Crystal", The Western Electric Engineer, April, 1977). Because of the level of precision and quickness in response required of a mirror used in applications of this type, it is necessary that such a mirror be not only of a high optical quality but also mounted to the rotatable shaft accurately. In other words, the mirror must be mounted centrally so that the centers of mass of the mirror and the mirror mount are and remain on the same axis of rotation as the shaft which provides the rotary motion.

For this purpose, the mounting must be effected so as not to put any unbalanced load on the shaft bearings. Conventional methods by using screw-type clamps are not satisfactory because they tend to loosen with time and usage.

SUMMARY OF THE INVENTION

It is therefore an object of the present invention to provide a method of and apparatus for mounting a mirror to a rotatable shaft such that the centers of mass of the mirror and the mirror mount are and remain both on the axis of rotation of the shaft.

It is another object of the present invention to provide a method of and apparatus for mounting a mirror to a rotatable shaft without screw-type clamps which tend to loosen.

The above and other objects of the present invention are achieved by providing a generally cylindrically-shaped adapter with its mass evenly distributed around its axis and having at one end a slot into which a protruding part of the mirror to be mounted is centrally inserted and an end section of the shaft inserted coaxially into a hollow interior at the other end of the adapter. The external surface of the adapter where the shaft is inserted is tapered and a clamp ring with its mass also evenly distributed and having a matchingly tapered inner surface is placed around the tapered external surface of the adapter and is pressed longitudinally to fasten the adapter onto the shaft.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 1 is a front view of an apparatus according to the present invention for mounting a mirror to a rotatable shaft, and FIG. 2 is a front view of an apparatus according to another embodiment of the present invention, and FIG. 3 is a front view of an outer clamp ring placed around the clamp ring shown in FIG. 1 to illustrate a method of using the apparatus of FIGS. 1 and 2.

DETAILED DESCRIPTION OF THE INVENTION

In FIGS. 1 and 2, there is shown an apparatus 10 according to the present invention for mounting a mirror 12 to a rotatable shaft 14, FIG. 1 being its front view and FIG. 2 being its side view. The apparatus 10 consists essentially of a nearly cylindrical adapter 20 and a clamp ring 30. At one end, the adapter 20 is provided with a slot 22 such that a protruding section 13 of the mirror 12 tightly fits therein with the center of mass of the mirror 12 lying on the central axis of the adapter 20. The other end of the adapter 20 is hollow to form a tubular structure such that an end section of the shaft 14 tightly fits therein with the axis of rotation of the shaft 14 coinciding with the central axis of the adapter 20. This tubular part of the adapter 20 where the shaft 14 is inserted is provided with a plurality of slits 22 to make the insertion of the shaft 14 easier and to provide the flexibility required for the clamping action described below. This part of the adapter 20 is also characterized as having a slightly tapered external surface 24, the outer diameter of the adapter 20 increasing towards the end thereof. The adapter 20 as a whole is so designed that its mass is equally distributed about its central axis.

The clamp ring 30 is also so designed that its mass is equally distributed about its central axis, and its inner surface is tapered to match the tapered external surface 24 of the adapter such that the ring 30 fits tightly over the tubular part of the adapter 20 enclosing the shaft 14 inside. A force applied to the ring 30 longitudinally along the central axis of the adapter 20 therefore has the effect of causing the adapter 20 to circumferentially contract and thereby tightly clamp around the shaft 14. Advantageously, the external surface of the clamp ring 30 is knurled so that an operator can twist it downward to exert a force more effectively.

In summary, the taper fit disclosed above allows one to fasten a mirror and an adapter to a rotatable shaft without using screw clamps or the like which tend to induce an unbalanced condition and/or a condition where use will cause the clamping device to loosen up over time and usage. After the mirror is properly inserted into the slot, an adhesive material such as cyanoacrylate may advantageously be used to affix the mirror securely to the adapter.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, as shown in FIG. 3, an outer ring 40 may be provided around the clamp ring 30 such that a plier-like crimping tool may be advantageously used with one jaw on the top surface of this outer ring 40 and the other jaw supporting the lower edge of the adapter 20. By squeezing the tool with its jaws positioned as described above, the tapers can be drawn together tightly without applying any force or load to the shaft 14. A reverse action tool with one jaw on the lower edge of the outer ring 40 and the outer jaw supported by the top edge of the adapter 20 will likewise allow one to unclamp the adapter 20 from the shaft 14. Such modifications and variations which may be apprent to a person skilled in the art are intended to be included within the scope of this invention.

What is claimed is:

1. An apparatus for mounting a mirror formed with a protruding part securely to a rotatable shaft, comprising
    an adaptor having a mirror-accepting end part formed with a slot for envelopingly accepting said protruding part and a shaft-accepting part at the opposite end from said mirror-accepting end part, said shaft-accepting part being tubular and slitted with a hollow interior into which an end of said shaft is slidingly insertable and having a tapered exterior surface outside said hollow interior, and
    a clamp ring having a tapered inner surface matching said tapered exterior surface of said adaptor, said clamp ring being disposed around said tubular shaft-accepting part and slidable along said tapered exterior surface parallel to said shaft so as to secure said adaptor to said shaft with said shaft inserted into said hollow interior.

2. The apparatus of claim 1 wherein said clamp ring is disposed coaxially around said end section of said adapter.

3. The apparatus of claim 2 wherein said clamp ring is disposed coaxially with said shaft.

4. The apparatus of claim 1 wherein said clamp ring has an evenly distributed mass.

5. The apparatus of claim 1 wherein said adapter is generally cylindrical in shape and has an evenly distributed mass.

6. The apparatus of claim 1 wherein said clamp ring is knurled on external surfaces.

7. The apparatus of claim 1 further comprising an outer ring disposed around said clamp ring.

8. The apparatus of claim 1 wherein said tapered exterior surface surrounds said tubular end section.

9. A method of mounting a mirror formed with a protruding part to a rotatable shaft comprising the steps of
    inserting an end of said shaft into a tubular shaft-accepting end section of a generally cylindrical adaptor with its mass evenly distributed around a central axis thereof and a slot formed in a mirror-accepting end section opposite from said shaft-accepting end section, said tubular end section having a tapered external surface,
    fastening said mirror to said adaptor by inserting said protruding part centrally into said slot, and
    fastening said adaptor around said shaft by placing a clamp ring around said tubular shaft-accepting end section of said adaptor, said clamp ring having an inner surface which is tapered matchingly to said tapered external surface of said adaptor and pushing said clamp ring slidingly on said tapered external surface substantially parallel to said shaft.

10. The method of claim 9 further comprising the step of applying an adhesive material where said protruding part of said mirror is inserted into said slot after the center of mass of said mirror is aligned with said central axis of said adapter.

* * * * *